United States Patent
Snyder et al.

(10) Patent No.: US 11,752,774 B2
(45) Date of Patent: Sep. 12, 2023

(54) INKJET PRINTER IMAGE IMPROVEMENT TECHNIQUES

(71) Applicant: ASSA ABLOY AB, Stockholm (SE)

(72) Inventors: Tanya Jegeris Snyder, Edina, MN (US); Dale James Ziebarth, Elk River, MN (US); Bradley O'Hara, Chanhassen, MN (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 17/060,643

(22) Filed: Oct. 1, 2020

(65) Prior Publication Data

US 2022/0080740 A1 Mar. 17, 2022

Related U.S. Application Data

(60) Provisional application No. 63/078,270, filed on Sep. 14, 2020.

(51) Int. Cl.
| | |
|---|---|
| *G06K 15/10* | (2006.01) |
| *H04N 1/405* | (2006.01) |
| *H04N 1/409* | (2006.01) |
| *H04N 1/58* | (2006.01) |
| *B41J 2/21* | (2006.01) |

(Continued)

(52) U.S. Cl.
CPC ......... *B41J 2/2132* (2013.01); *B41J 2/04593* (2013.01); *B41J 13/12* (2013.01); *G06K 15/105* (2013.01); *H04N 1/409* (2013.01); *H04N 1/4057* (2013.01); *H04N 1/58* (2013.01)

(58) Field of Classification Search
CPC ....... H04N 1/58; B41J 2/2132; B41J 2/04593; G06K 15/105; G06K 15/107
See application file for complete search history.

(56) References Cited

U.S. PATENT DOCUMENTS 5,818,474 A * 10/1998 Takahashi ............ G06K 15/107
347/15
6,685,312 B2   2/2004 Klinefelter et al.
(Continued)

FOREIGN PATENT DOCUMENTS

CN   103402777    11/2013
CN   114179510 A   3/2022
(Continued)

OTHER PUBLICATIONS

"European Application Serial No. 21181771.3, Partial Supplementary European Search Report dated Dec. 22, 2021", 16 pgs.
(Continued)

*Primary Examiner* — Julian D Huffman
(74) *Attorney, Agent, or Firm* — Schwegman Lundberg & Woessner, P.A.

(57) ABSTRACT

Techniques for reducing or eliminating image banding in an ink-jet image are provided. In an example, a method of operating a printer to reduce or eliminate image banding can include generating command profile for printing a given image, applying a filter to the command profile to provide a filtered profile, and dispensing ink from a printhead of the printer based on the filtered profile. In certain examples, the filter can randomize droplet sizes of ink dispensed while executing the printing to reduce or eliminate image banding.

20 Claims, 6 Drawing Sheets

(51) Int. Cl.
*B41J 2/045* (2006.01)
*B41J 13/12* (2006.01)

(56) References Cited

U.S. PATENT DOCUMENTS

| | | | |
|---|---|---|---|
| 2006/0017759 A1* | 1/2006 | Matsuzawa | B41J 2/21 347/15 |
| 2007/0013757 A1 | 1/2007 | Ohnishi | |
| 2008/0180475 A1 | 7/2008 | Eldar et al. | |
| 2010/0149240 A1 | 6/2010 | Nakanishi et al. | |

FOREIGN PATENT DOCUMENTS

| | | |
|---|---|---|
| EP | 1629979 | 3/2006 |
| EP | 2196318 | 6/2010 |
| EP | 2658721 | 11/2013 |
| JP | S60107975 A | 6/1985 |

OTHER PUBLICATIONS

"European Application Serial No. 21181771.3, Extended European Search Report dated Apr. 4, 2022", 20 pgs.
"European Application Serial No. 21181771.3, Response Filed Oct. 27, 2022 to Extended European Search Report dated Apr. 4, 2022", 14 pgs.
"Chinese Application Serial No. 202110721804.0, Office Action dated Dec. 23, 2022", w English Translation, 16 pgs.
"Chinese Application Serial No. 202110721804.0, Response Filed Apr. 23, 2023 to Office Action dated Dec. 23, 2022", W English Claims, 13 pgs.

* cited by examiner

INKJET PRINTER IMAGE IMPROVEMENT TECHNIQUES

FIELD OF THE DISCLOSURE

The present document relates to printing and more particularly, to techniques for reducing image banding in an ink jet printed image.

BACKGROUND OF THE DISCLOSURE

Card products include, for example, credit cards, identification cards, driver's licenses, passports, and other card products. Such card products generally include printed information, such as a photo, account numbers, identification numbers, and other personal information. Credentials can also include data that is encoded in a smartcard chip, a magnetic stripe, or a barcode, for example.

Card production systems include processing devices that process card substrates (hereinafter "cards") to form the final card product. Such processes may include a printing process, a laminating or transfer process, a data reading process, a data writing process, laser engraving, and/or other process used to form the desired credential. An ink jet card printer is a form of card production system that utilizes an ink jet print head to print images to cards.

Although image banding can occur in other situations, such as when an ink jet printer has a fault or correctable condition, when an image includes a large field of color, noticeable bands can be visible where ink bleed establishes a visual pattern, typically a line, within the large field of color. For some applications, such image banding can be unacceptable.

SUMMARY OF THE DISCLOSURE

Techniques for reducing or eliminating image banding in an ink-jet image are provided. In certain examples, an apparatus can include a print head and a controller. The print head can be configured to selectively emit ink toward a print area to generate a printed image. The print head can be configured to pass across the print area along a first linear axis to provide the printed image. The controller can be configured to receive a representation of the printed image, to control relative motion of the print head along the first linear axis based on the representation, to provide first control signals to control emission of the ink from the print head based on the representation, and to apply a filter to the first control signals to provide second control signals to control emission of the ink from the print head so as to reduce visual banding of the printed image.

In certain examples, a method of operating a printer to reduce or eliminate image banding can include generating command profile for printing a given image, applying a filter to the command profile to provide a filtered profile, and dispensing ink from a printhead of the printer based on the filtered profile. In certain examples, the filter can randomize droplet sizes of ink dispensed while executing the printing to reduce or eliminate image banding.

DETAILED DESCRIPTION

Examples of the present disclosure are generally directed to techniques for reducing or eliminating banding within an image printed by an ink jet card printer. Although banding can occur in other situations, when an image includes a large field of color, noticeable bands can be visible where ink bleed establishes a visual pattern, typically a line, within the large field of color. In certain examples, banding can be reduced, or eliminated from visual perception by a viewer, by applying a filter to alter dispensing of ink from ink jets that typically contribute to banding.

Figure 1:
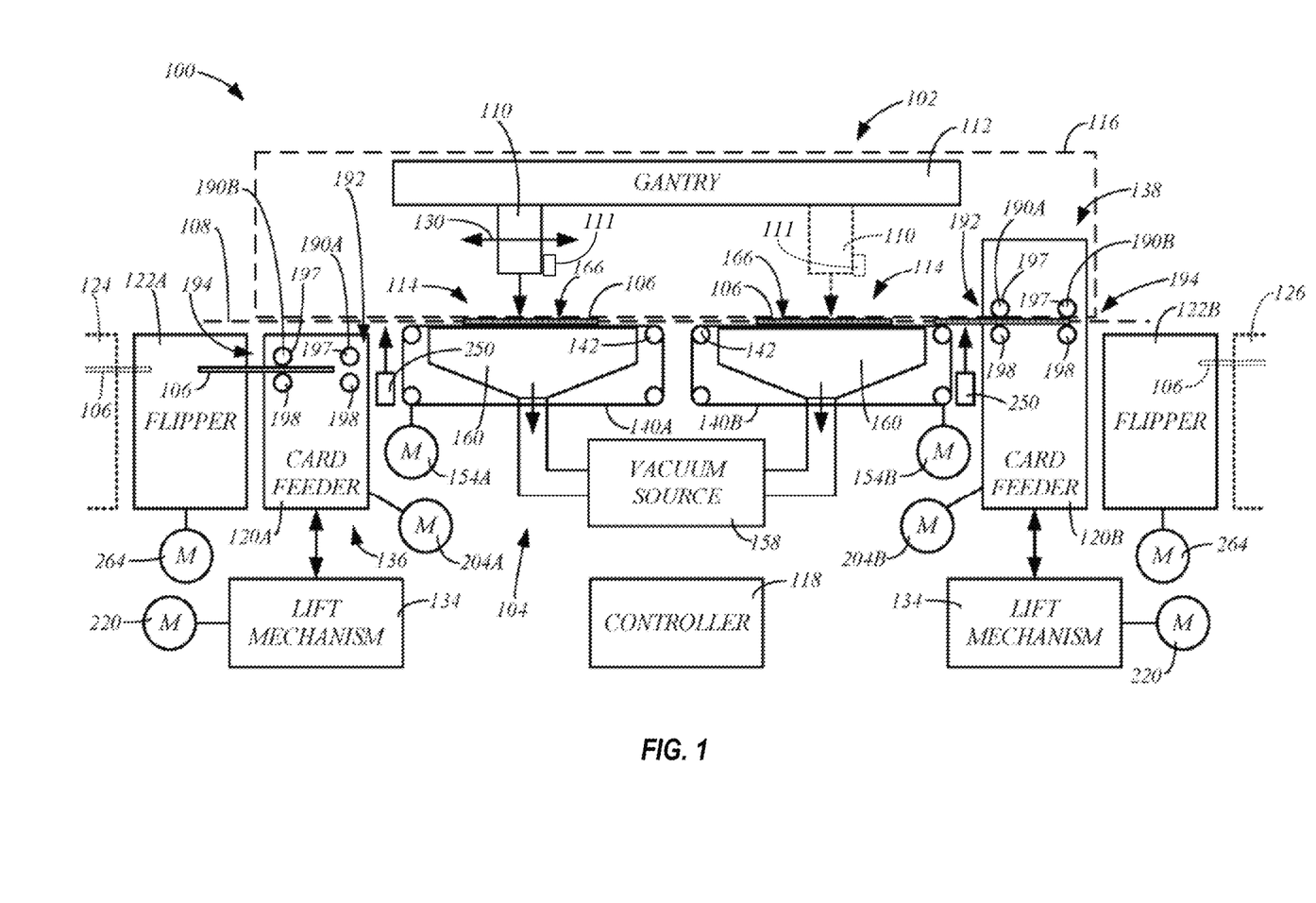
FIG. 1 illustrates generally a block diagram side view of an example ink jet card printer according to the present subject matter.
Figure 2:
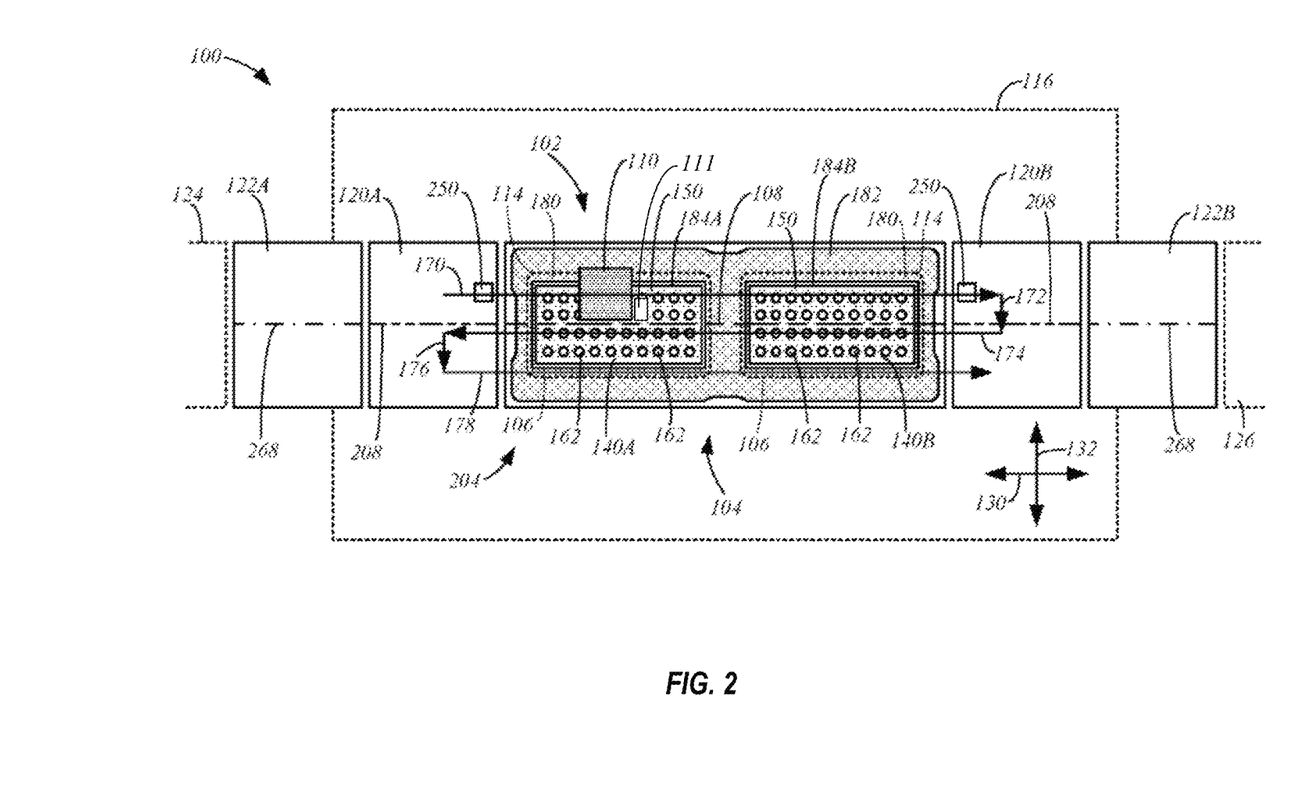
FIG. 2 illustrates generally a top view of an example ink jet card printer according to the present subject matter.

FIGS. 1 and 2 are simplified side and top views of an ink jet card printer 100, or portions thereof, in accordance with the present subject matter. In some examples, the ink jet card printer 100 includes a print unit 102, and a card transport 104. The card transport 104 is configured to feed individual cards 106 along a processing axis 108. The print unit 102 includes an ink jet print head 110 and a gantry 112. The print head 110 is configured to perform a printing operation on individual cards 106 supported by the card transport 104 in one or more print positions 114 along the processing axis 108. The gantry 112 is configured to move the print head 110 through a print zone 116 during printing operations.

In some examples, the ink jet card printer 100 includes a controller 118, which represents one or more distinct controllers of the ink jet card printer 100, each of which includes at least one processor that is configured to execute program instructions stored in a computer-readable media or memory of the ink jet card printer 100, which may also be represented by the controller 118, or another location. Any suitable patent subject matter eligible computer readable media or memory may be utilized including, for example, hard disks, CD-ROMs, optical storage devices, flash memory, magnetic storage devices, or other suitable computer readable media or memory that do not include transitory waves or signals. The execution of the instructions by the controller 118 controls components of the ink jet card printer 100 to perform functions and method steps described herein.

In certain examples, the ink jet card printer 100 may include one or more card feeders 120, such as card feeders 120A and 120B, that are each configured to deliver cards 106 to, and receive cards 106 from, the card transport 104. The ink jet card printer 100 may also include one or more card flippers 122, such as flippers 122A and 122B, that are configured to invert the cards 106. A card supply 124, such as a card cartridge containing a stack of cards, may be provided to supply cards 106 for processing by the ink jet card printer 100, and processed cards may be discharged and collected by a suitable card collector (e.g., a hopper) 126.

The ink jet print head 110 is configured to perform a direct printing operation to individual cards 106 supported in the print positions 114 along the processing axis 108. The gantry 112 can move the print head 110 along a first scan axis 130 that is substantially parallel to the processing axis 108, and a second scan axis 132 that is substantially perpendicular to the processing axis 108, as shown in FIG. 2, during printing operations. As used herein, the term "first scan axis" refers to the axis along which the print head 110 is moved by the gantry 112 during an active printing phase of the operation, during which ink is discharged from the print head 110 to form the image on the card 106. The term "second scan axis" refers to the axis along which the print head 110 can be moved by the gantry 112 during an inactive printing phase (ink is not discharged from the print head) to position the print head 110 for the next active printing phase.

In certain examples, the gantry 112 and the print head 110 may occupy the print zone 116 during printing operations, which is indicated by dashed boxes in FIGS. 1 and 2. The print zone 116 may generally extend from the processing axis 108, or immediately above the processing axis 108, into at least a portion of the space above the card transport 104 and the card feeders 120. The print zone 116 may also surround the card transport 104 and the card feeders 120, as shown in FIG. 2.

Figure 3:
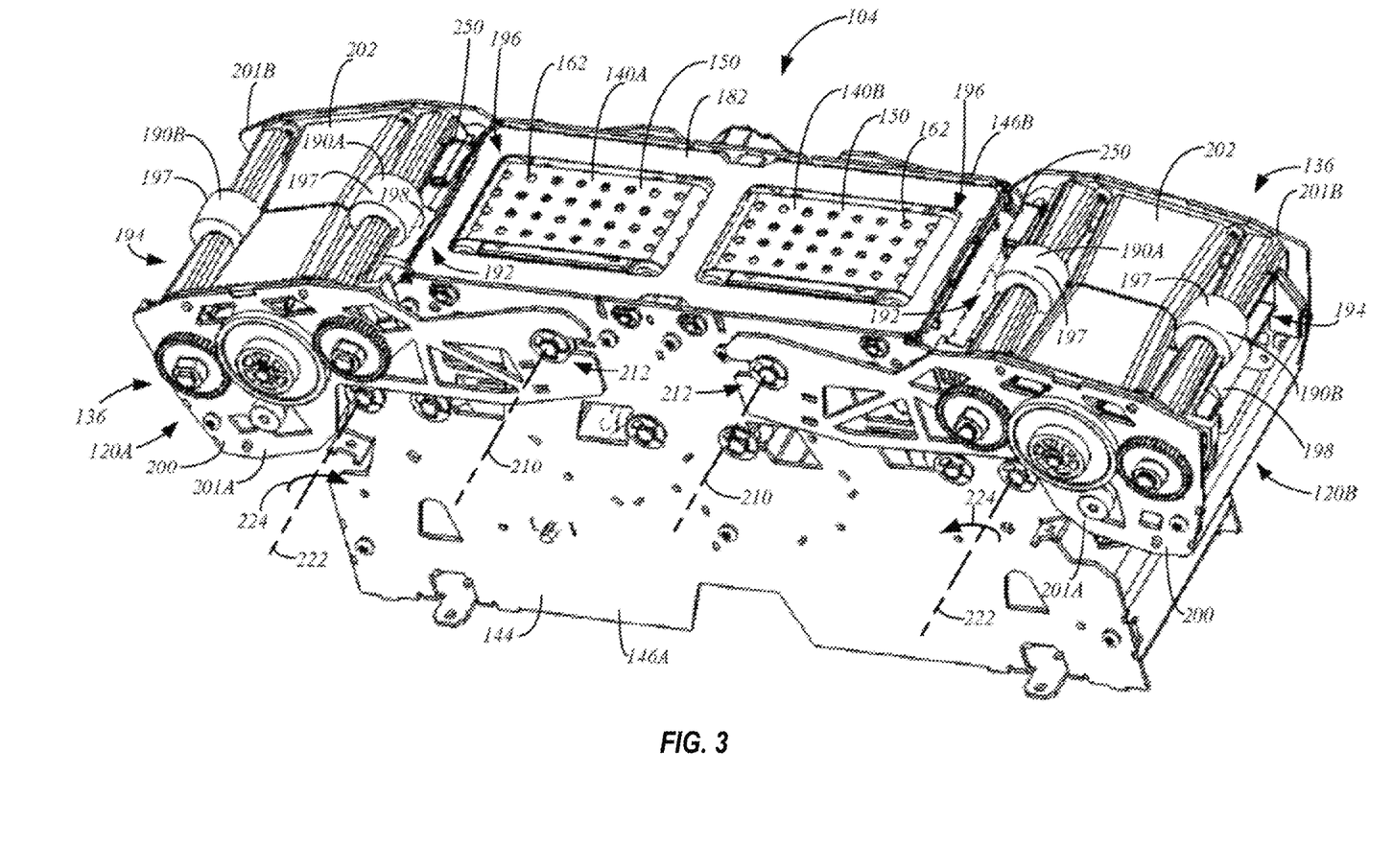
FIG. 3 illustrates generally a perspective view of a card transport of an example ink jet card printer according to the present subject matter.

In certain examples, the card feeders 120 each include a lift mechanism 134 to move the card feeders 120 to a lowered position, in which the card feeders 120 are displaced from the print zone 116, such as below the print zone 116, as indicated by card feeder 120A in FIG. 1, and the card feeders 120A and 120B in FIG. 3. FIG. 3 is an isometric view of a card transport 104 and card feeders 120 in their lowered positions 136.

The lift mechanisms 134 may also move the card feeders 120 to a raised position, in which at least a portion of the card feeders 120 extend into the print zone 116, and the card feeders 120 are positioned to feed cards 106 to, or receive cards 106 from, the card transport 104, as indicated by the card feeder 120B in FIG. 1. Thus, the card feeders 120 may be moved to their raised positions by the lift mechanisms 134 to facilitate feeding cards 106 to or receiving cards 106 from the card transport 104.

Thus, the lift mechanisms 134 may be used to move the card feeders 120 from their raised positions, in which at least a portion of the card feeders 120 would obstruct a printing operation, to their lowered positions, in which the card feeders 120 do not obstruct the print zone 116, to enable the print head 110 to be moved through the print zone 116 by the gantry 112 and perform a printing operation.

In certain examples, the card transport 104 includes belts 140, such as first and second belts 140A and 140B (i.e., belt feeders or conveyors), that are each supported by rollers 142 for movement along a belt path. In one example, the first and second belts 140A and 140B are each supported by four rollers 142, which are supported by a belt frame 144, such as side walls 146A and 146B of the belt frame 144 (FIG. 3). The belts 140 include exposed portions 150 adjacent the processing axis 108. The exposed portion 150 of each of the belts 140 is used to feed the cards 106 along the processing axis 108 and support the cards 106 in the print positions 114.

Motors 154A and 154B can independently drive the first and second belts 140A and 140B along their belt paths. Thus, the exposed portion 150 of the first belt 140A may independently feed a card 106 along the processing axis 108 in a direction toward the second belt 140B or in a direction toward the card feeder 120A using the motor 154A, and the exposed portion 150 of the second belt 140B may independently feed a card 106 along the processing axis 108 in the direction toward the first belt 140A, or in the direction toward the card feeder 120B using the motor 154B.

The belts 140 of the card transport 104 may take on any suitable form. In certain examples, the belts 140 are conventional vacuum belts that are coupled to a vacuum source 158 (i.e., a source of negative pressure), such as a regenerative vacuum blower. The vacuum source 158 may be shared by the belts 140, as shown in FIG. 1, or separate vacuum sources 158A and 158B may respectively be used by the belts 140A and 140B. Chambers 160 couple the negative pressure generated by the vacuum source 158 to the exposed portions 150 of the belts 140. The negative pressure is communicated to a top side of the exposed portions 150 through apertures 162 in the belts, which are shown in FIGS. 2 and 3, and is used to secure cards 106 to the exposed portions 150 during card feeding and printing operations. Thus, when a card 106 engages the top surface of the exposed portion 150 of one of the belts 140, the negative pressure generated by the vacuum source 158 or sources 158A and 158B adheres the card 106 to the belt 140. When the belts 140 are driven by the corresponding motor 154, the adhered card 106 is driven along the processing axis 108.

For example, referring to FIG. 2, with the card feeders 120 in their lowered positions, and the cards 106 held in the print positions 114 against the exposed portions 150 of the belts 140A and 140B due to the negative pressure generated by the vacuum source 158 or sources 158A and 158B, the gantry 112 may move the print head 110 along the first scan axis 130 (processing axis 108) over the cards 106, while the print head 110 prints image lines to the surfaces 166, as indicted by arrow 170. After the print head 110 is moved past the end of the card 106 adjacent the card feeder 120B, the gantry 112 shifts the print head 110 along the second scan axis 132, as indicated by arrow 172. The gantry 112 then moves the print head 110 back along the first scan axis 130 (arrow 174), during which the print head 110 prints image lines to the surfaces 166 of the cards 106. The gantry 112 again shifts the position of the print head 110 along the second scan axis 132 (arrow 176), and the print head 110 prints image lines as the gantry 112 moves the print head 110 along the first scan axis 130 (arrow 178). These steps of printing image lines while moving the print head 110 along the first scan axis 130 and shifting the position of the print head 110 along the second scan axis 132, are repeated until the images have been printed to the surfaces 166 of the cards 106. Accordingly, a single print operation may simultaneously print images to two cards 106 supported on the belts 140.

To print a full edge-to-edge image on a card 106, the print head 110 may be configured to print an image that is slightly larger than the surface 166 of the card 106. As a result, some ink will overspray the edges of the card 106.

In certain examples, the exposed surface 150 of each belt 140 has a smaller surface area than the card 106. That is, the width and length of the exposed belt surfaces 150 are selected such that they are less than the corresponding width and length of the cards 106, as generally shown in FIG. 2 with the cards 106 shown in phantom lines. Thus, when a card 106 is in the print position 114, the entirety of the exposed belt surface 150 is covered by the card 106, and a perimeter portion 180 of the card 160 extends beyond the edges of the exposed belt surface 150. This allows the print head 110 to print images that extend to the edges of the surfaces 166 of cards 106 while protecting the exposed belt surface 150 from ink contamination.

In certain examples, the card feeders 120 each include at least one pinch roller pair 190, such as pinch roller pairs 190A and 190B. In certain examples, at least a portion of one or both of the pinch roller pairs 200 extends into the print zone 116 when the card feeder 120 is in a raised position. The pinch roller pairs 190A and 190B are respectively positioned adjacent ports 192 and 194 of the card feeder 120, with the port 192 being positioned adjacent an input/output end 196 of the corresponding belt 140, as shown in FIG. 3. Each pinch roller pair 190 may include an idler roller 197 and a motorized feed roller 198 that are supported by a card feeder frame 200, such as between side walls 201A and 201B of the frame 200, as shown in FIG. 3. While the idler roller 197 is illustrated as being the top roller in the provided examples, it is understood that the positions of the rollers 197 and 198 may be reversed. A cover 202 may be positioned between the pinch roller pairs 190A and 190B to cover a portion of the path through which cards 106 are fed through the card feeder 120, as shown in FIG. 3.

The card feeders 120A and 120B respectively include motors 204A and 204B for driving the motorized rollers 198 to feed a card 106 supported between one or both of the pinch roller pairs 190A and 190B along a card feed axis 208. The separate motors 204 of the feeders 120 allow the controller 118 to independently control the card feeders 120. As a result, the card feeder 120A may be used to deliver a card 106 to the belt 140A while the card feeder 120B delivers a card 106 to the collector 126, for example.

The card feed axis 208 of each feeder 120 is substantially parallel to a vertical plane extending through the processing axis 108. Thus, as shown in the top view of FIG. 2, the card feed axes 208 of the feeders 120 are oriented substantially parallel (e.g., +−0.5 degrees) to the processing axis 108 within a horizontal plane.

In certain examples, the lift mechanisms 134 pivot the frame 200 of the card feeders 120 about a pivot axis 210 (FIG. 3) during movement of the card feeders 120 between their raised and lowered positions. As a result, the orientation of the card feed axis 208 relative to the processing axis 108 in a vertical plane changes with movement of the card feeders 120 between their raised and lowered positions 138 and 136. When the card feeder 120 is in its lowered position, the card feed axis 208 is at an oblique angle (e.g., 20-50 degrees) to the processing axis 108 in the vertical plane. When the card feeder 120 is in its raised position, the card feed axis 208 is substantially parallel to the processing axis 108 in the vertical plane, allowing the card feeder 120 to deliver a card 106 to the adjacent belt 140, or receive a card 106 from the adjacent belt 140 using one or more of the pinch roller pairs 190.

In certain examples, the pivot axis 210 is defined by a pivotable connection 212 between the card feeder frame 200 and the belt frame 144, as indicated in FIG. 3. In one example, the pivotable connection or hinge 212 is formed between the side walls 201A and 201B of the card feeder frame 200 and the corresponding side walls 146A and 146B of the belt frame 144.

During an exemplary lift operation, in which the card feeder 120 is moved from the lowered position to the raised position, the controller 118 activates the motor 220 of the lift mechanism 134 to drive rotation of a cam (not shown) about the axis 222 in the direction indicated by arrow 224 in FIG. 3. As the cam rotates, it drives the card feeder frame 120 to pivot about the pivot axis 210 until the card feeder 120 reaches the raised position. The operation is reversed to move the card feeder 120 back to its lowered position.

Ideally, each card feeder 120 supports a received card 106 such that a central axis of the card 106 is aligned with the card feed axis 208. This ensures that the card 106 is fed to the adjacent belt 140 in alignment with the processing axis 108, which allows for accurate positioning of the card 106 in the print position 114 on the belt 140 and accurate printing of an image to the card surface 166.

The printer 100 may include one or more sensors 250 to facilitate various card feeding operations, such as receiving a card 106 in the card feeders 120 and positioning a card 106 in the print position 114 on the belts 140. In one example, the printer 100 includes a card sensor 250 for detecting the presence or absence of a card at each side of the card transport 104. In certain examples, the card sensors 250 are positioned between the pinch roller pair 190A and the adjacent belt 140. In certain examples, the card sensors 250 are supported by the card feeder frame 200.

During reception of a card 106 by a card feeder 120 in its lowered position, the sensor 250 may be used to detect the leading edge of the card 106 being fed toward the card transport belt 140, which may indicate that the card 106 is fully received in the card feeder 120. The card feeder 120 may then be moved from the lowered position to the raised position. After the card feeder 120 is moved to the raised position, the corresponding card sensor 250 may be used to detect the trailing edge of the card 106 as the card is fed to the adjacent belt 140. The controller 118 may use this detection of the trailing edge of the card 106 to control the belt 140 to position the card 106 in the desired print position 114.

The card sensors 250 may also be used by the controller 118 to control the reception of cards 106 fed from the belts 140 by the card feeders 120. For example, as a card 106 is fed from the belt 140 toward the card feeder 120, the card sensor 250 may detect the leading edge of the card 106. This detection may be used by the controller 118 to control the pinch roller pairs 190 to receive the card 106 in the card feeder 120. The card 106 may then be fed into the card feeder 120 using the pinch roller pairs 190 until the sensor 250 detects the trailing edge of the card 106 indicating that the card 106 has been fully received within the card feeder 120 and that the card feeder 120 is ready to be moved to its lowered position 136.

As mentioned above, the printer may optionally include one or more card flippers 122 driven by one or more motors 264 that may be used to invert cards 106 to facilitate printing operations on both sides of the cards 106. Each card flipper 122 may be configured to receive a card 106 from the adjacent card feeder 120, the card supply (flipper 122A) or the card collector (flipper 122B), rotate the card 106 about a flipping axis 260 to invert the card 106, and pass the inverted card 106 back to the adjacent card feeder 120, which can deliver the inverted card 106 to the card transport 104 and the print unit 102 for a printing operation.

Some examples of the present disclosure are directed to methods of printing an image to one or more cards 106 using the ink jet card printer 100. In one example of the method, a card 106, which may have been received from the supply 124 and fed to the card feeder 120A by the card flipper 122A, is supported by the pinch roller pairs 190 of the card feeder 120A while in its lowered position. The card feeder 120A is moved to its raised position using the corresponding lift mechanism 134, and the card 106 is discharged from the card feeder 120A to the belt 140A using the pinch roller pair 190A. The card feeder 120A is then moved to the lowered position and out of the print zone 116 using the lift mechanism 134, and the card 106 is fed along the processing axis 108 by the belt 140A to the print position 114 (FIG. 2). An image is then printed to the surface 166 of the card 106 using the print head 110, which involves moving the print head 110 with the gantry 112 through the print zone 116.

In certain examples, the ink jet card printer 100 can include a cure light 111 to assist in hardening recently ejected ink. Such a cure light 111 can project ultraviolet (UV) light for curing UV-curable inks. In some examples, the cure light 111 can be attached to the ink jet print head 110 and can move with the ink jet print head 110. In some examples, the cure light 111 is attached to an axis separate from the ink jet print head axis and can move independent of the ink jet print head 110. In operation, after an image is printed, conventional systems pass an illuminated cure light across the entire width or length of the printed media to cure, or harden, the printed ink. For an ink jet printer according to the present subject matter, after printing of an image onto print media using curable ink, the cure light 111 can be passed over the image at a cure speed and can be moved over unprinted portions of the print media, or retracted over cured portions if the image, at a speed higher than the cure speed.

In certain examples, the printer 100 includes an ink overspray collector 182 that surrounds a perimeter of the exposed belt surface 150 and extends beyond the edges of the cards 106 when in their print positions 114, as shown in FIG. 2. Thus, the collector 182 is positioned to receive ink that is sprayed over the lengthwise and widthwise edges of the cards 106 during a printing operation. In certain examples, the ink overspray collector 182 is a disposable component that may be periodically removed and replaced by an operator of the printer 100. The collector 182 may be formed of plastic, paper, cardboard, or another suitable material. In certain examples, the collector 182 is a single piece of material having an opening 184A for the exposed belt surface 150 of the belt 140A, and an opening 184B for the exposed belt surface 150 of the belt 140B.

Ink jet image banding can result from a number of causes including print head anomalies, faulty ink jet nozzles, faulty print media indexing, faulty print head indexing or combinations thereof. However, even when the printer and print media are fault free, banding caused by ink bleed can still occur, resulting in deterioration of image quality. Such banding caused by ink bleed can occur at a joint between passes of the ink jet print head especially when printing an image with a dense color area. Such banding can also occur within a single pass due to the ink from a particular nozzle or a couple of adjacent nozzles bleeding together in a repeating pattern. The banding caused by ink bleed has a feature in that the band can appear as a stripe with higher density or a deeper shade of color compared to the surrounding area of the same or similar color.

The present inventors have recognized techniques to reduce or eliminate image banding due to ink bleed. In certain examples, the controller compensates ink jet signals to reduce or eliminate image banding due to ink bleed. In such an example, the controller can apply a filter to the uncompensated ink jet dispense signals. The filter can randomize certain dispense characteristics of the ink jets to eliminate the image banding. Dispense characteristics can include, but are not limited to, signal timing to each ink jet, droplet size, etc.

Figure 4:
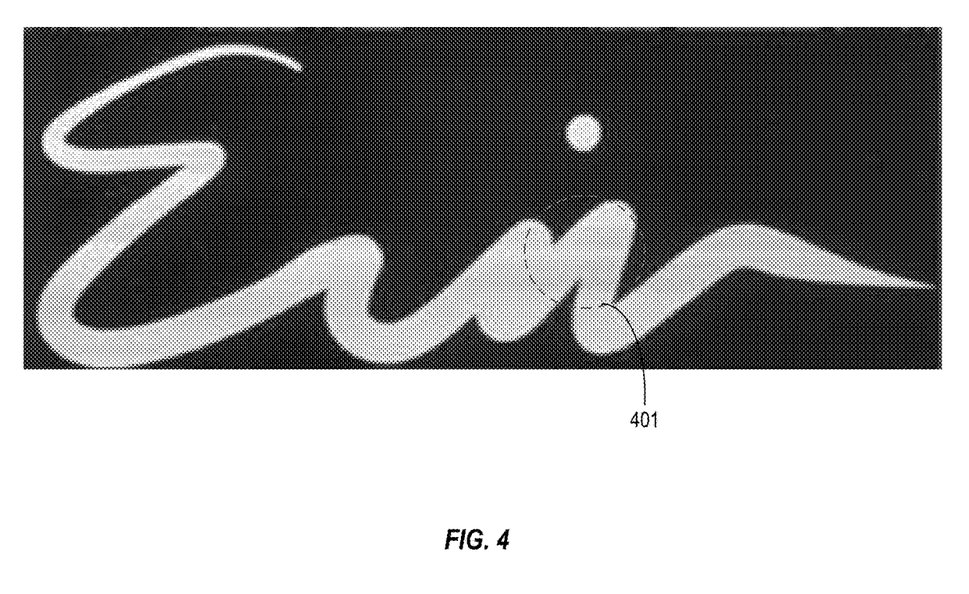
FIG. 4 illustrates generally an ink jet image that exhibits banding.

FIG. 4 illustrates generally an ink jet image that exhibits banding. The image is intended to appear as a signature, "Erin", formed from a light foreground color on or within a dark background. The horizontal banding can be particularly be observed in the strokes forming the "i" and "n" and indicated by the dashed circle 401. However, additional banding can be observed at other locations of the signature, such as the top of the "r". The banding, in some commercial settings, can render the image unacceptable.

Figure 5:
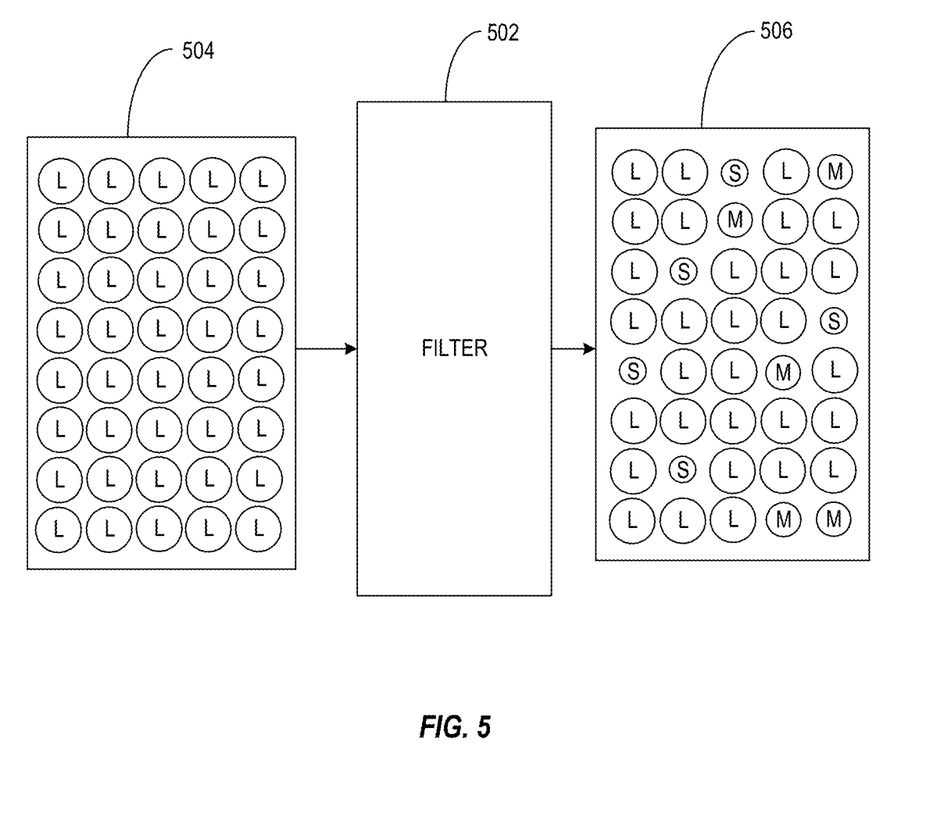
FIG. 5 illustrates an example application of a filter to randomize droplet size of an area of an image to be printed to eliminate image banding.

FIG. 5 illustrates an example application of a filter 502 to randomize droplet size of an area of an image to be printed to eliminate image banding. In certain examples, the randomization can be semi-, or quasi-random based on an algorithm or formula, or based on a predetermined pattern designed or configured to reduce banding. In certain examples, the filter can be a noise filter, such as a blue noise filter, red noise filter or a green noise filter. A blue noise filter tends to have higher power distribution at higher frequencies compared to power distribution at lower frequencies. In certain examples, a blue noise filter can generate random numbers in an array that can be applied to a command droplet profile 504 for a given image that includes command droplet sizes for each droplet to be ejected from the ink jets of the printer. In some examples, a controller can provide the command droplet profile 504 based on a given image. If the generated image shows image banding when printed, the user, or a banding detection system, can enable the controller to apply the filter 502 over at least the area exhibiting the image banding on subsequent print operations. The controller can then apply the filter 502 to the command droplet profile 504 to provide a filtered droplet profile 506. In some applications, the filter can randomize the droplet size of any particular ink droplet.

In some examples, especially for areas with a constant color and high contrast background, the randomization generally reduces the overall average droplet size for the area selected. As such, the printed portion can be fainter than an image using the command droplet profile 504. For example, in application where light colored printing is placed on a dark background, such white printing on a black background, the printing can appear as light gray. To remedy the fainter color depth, one or more additional print passes can be selected. Each additional print pass can use the same filtered droplet profile 506 or a new filtered droplet profile.

Figure 6:
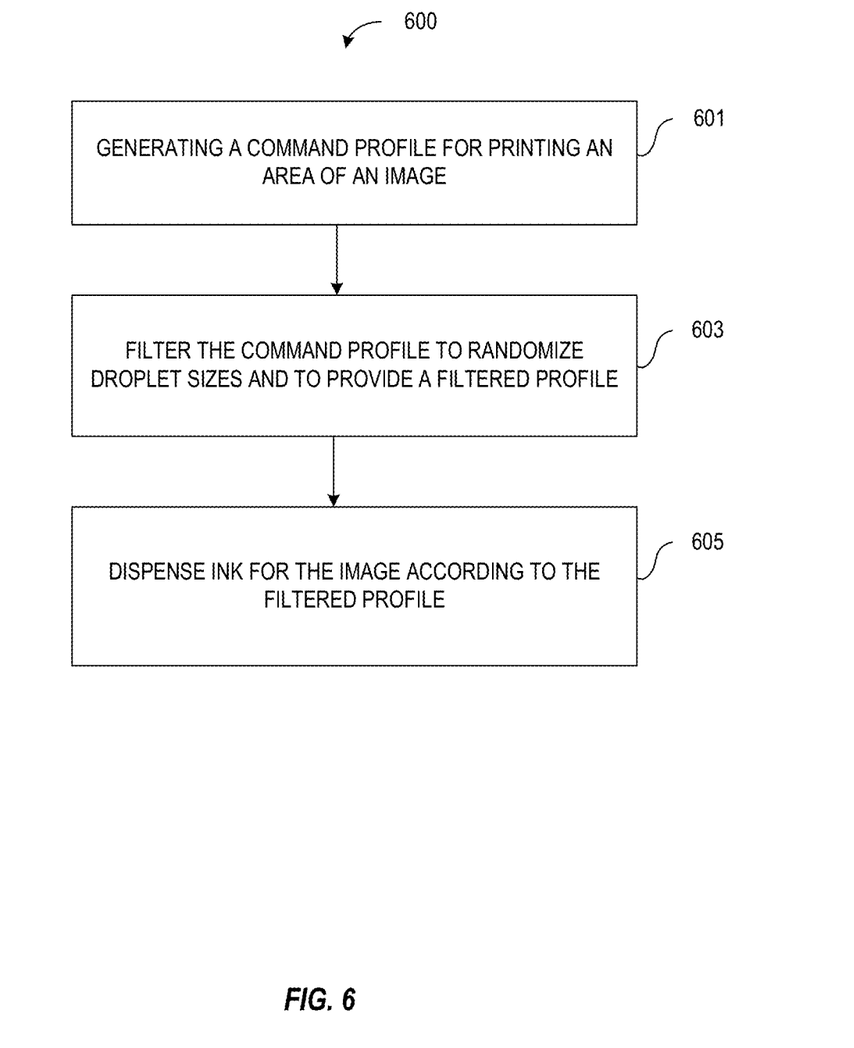
FIG. 6 illustrates generally an example method of operating a printer to reduce or eliminate image banding.

FIG. 6 illustrates generally an example method 600 of operating a printer to reduce or eliminate image banding. At 601, a controller of a printer can generate a command profile for moving a print head and dispensing ink for a certain area of an image. The command profile can include droplet sizes for producing the image. At 603, a filter can be applied to the command profile to generate a filtered profile. The filter can randomize droplet sizes of the command profile. In some examples, the filter can be a stochastic filter. In some examples, the filter can be a blue noise filter. In some examples, the filter can be a stochastic, blue noise filter. At 605, ink for the image can be dispensed according to the filtered profile. In certain examples, the filter, on average, reduces the average droplet size of the command profile, thus, for a given pass, the amount of ink dispensed according to the filtered profile is reduced. As such, a single layer of ink according to the filtered profile may not provide the color depth or may be too transparent for acceptance. In certain examples, a parameter, either user-selectable or automatic, can allow the controller to execute multiple print passes using a filtered profile for each print pass of the command profile. The multiple print passes can allow the completed image to have the same color depth and opacity as the image would if printed using the command profile, but with reduced or little image banding.

EXAMPLES AND NOTES

In a first example, Example 1, an apparatus can include: a print head configured to selectively emit ink toward a print area to generate a printed image, the print head, relative to the print area, configured to pass across the print area along a first linear axis to provide the printed image; a controller configured to receive a representation of the printed image, to control relative motion of the print head along the first linear axis based on the representation, to provide first control signals to control emission of the ink from the print head based on the representation, to apply a filter to the first control signals to provide second control signals to control emission of the ink from the print head and to minimize visual banding of the printed image.

In Example 2, the subject matter of Example 1 includes, wherein the print head is an ink-jet print head.

In Example 3, the subject matter of Example 2 includes, wherein the ink jet print head is configured to emit ultra-violet (UV) curable ink.

In Example 4, the subject matter of Examples 2-3 includes, wherein the filter is configured to modulate a size of droplet of the ink emitted from multiple ink jets od the ink jet print head to disrupt creation of the visual banding.

In Example 5, the subject matter of Examples 1-4 includes, wherein the filter is a blue noise filter.

In Example 6, the subject matter of Examples 1-5 includes, wherein the filter is a stochastic filter.

In Example 7, the subject matter of Examples 1-6 includes, wherein the controller is configured to execute multiple print passes of the print head according to the second control signals for each print pass of the first control signals.

Example 8 is a method of operating a printer, the method comprising: generating command profile for printing a given image; applying a filter to the command profile to reduce banding in a printed representation of the given image, and to provide a filtered profile; and dispensing ink from a printhead of the printer based on the filtered profile.

In Example 9, the subject matter of Example 8 includes, wherein the applying the filter includes applying a stochastic filter to the command profile reduce banding in the printed representation of the given image, and to provide the filtered profile.

In Example 10, the subject matter of Examples 8-9 includes, wherein the applying the filter includes applying a blue noise filter to the command profile to reduce banding in the printed representation of the given image, and to provide the filtered profile.

In Example 11, the subject matter of Examples 8-10 includes, wherein the applying the filter includes randomizing droplet sizes of the command profile to provide the filtered profile.

In Example 12, the subject matter of Example 11 includes, wherein the dispensing ink includes dispensing the ink via multiple passes according to the filtered profile for a single pass of the command profile.

In Example 13, the subject matter of Examples 8-12 includes, where the dispensing ink includes dispensing ink from an ink jet printhead of the printer based on the filtered profile.

In Example 14, the subject matter of Example 13 includes, where the dispensing ink from the ink jet printhead of the printer based on the filtered profile includes dispensing ultra-violet (UV) curable ink from the ink jet printhead of the printer based on the filtered profile.

Example 15 is a machine-readable medium including instructions that, when executed by processing circuitry, cause the processing circuitry to perform operations, the operations comprising: generating command profile for printing a given image; applying a filter to the command profile to reduce banding in a printed representation of the given image, and to provide a filtered profile; and dispensing ink from a printhead of the printer based on the filtered profile.

In Example 16, the subject matter of Example 15 includes, wherein the operation of applying the filter includes applying a stochastic filter to the command profile reduce banding in the printed representation of the given image, and to provide the filtered profile.

In Example 17, the subject matter of Examples 15-16 includes, wherein the operation of applying the filter includes applying a blue noise filter to the command profile to reduce banding in the printed representation of the given image, and to provide the filtered profile.

In Example 18, the subject matter of Examples 15-17 includes, wherein the operation of applying the filter includes randomizing droplet sizes of the command profile to provide the filtered profile.

In Example 19, the subject matter of Example 18 includes, wherein the operation of dispensing ink includes dispensing the ink via multiple passes according to the filtered profile for a single pass of the command profile.

In Example 20, the subject matter of Examples 15-19 includes, wherein the operation of dispensing ink includes dispensing ink from an ink jet printhead of the printer based on the filtered profile.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

What is claimed is:

1. An apparatus comprising:
   a print head configured to selectively emit ink toward a print area to generate a printed image, the print head, relative to the print area, configured to pass across the print area along a first linear axis to provide the printed image; and
   a controller configured:
      to receive a representation of an image to be printed;
      based on the representation, to provide first control signals for controlling emission of the ink from the print head in each of a plurality of single print passes of the print head;
      to apply one or more filters to the first control signals to provide second control signals that control droplet sizes of the ink from a plurality of ink jet nozzles of the print head; and
      to control motion of the print head to execute multiple passes of the print head across the print area along the first linear axis according to the second control signals in place of each single print pass according to the first control signals;

wherein the droplet sizes pursuant to the second control signals differ between the plurality of ink jet nozzles within a given print pass of the multiple passes of the print head along the first linear axis so as to reduce visual banding of the image to be printed.

2. The apparatus of claim 1, wherein the print head is an ink jet print head configured to emit ultra-violet (UV) curable ink.

3. The apparatus of claim 1, wherein the one or more filters include a stochastic, blue noise filter.

4. The apparatus of claim 1, wherein the multiple passes of the print head are configured to increase an opacity of the image to be printed compared to a single pass of the print head.

5. The apparatus of claim 1, further comprising a banding detection system configured to detect image banding and enable the controller to apply the one or more filters.

6. A method of operating a printer, the method comprising:
   generating a command profile for printing a given image, the command profile including droplet sizes for a plurality of single print passes of a print head of the printer for producing the given image;
   generating a filter comprising an array of numbers, the numbers being at least one of: random, semi-random, quasi-random, based on an algorithm, or based on a predetermined pattern;
   applying the filter to the command profile to provide a filtered profile of modified droplet sizes configured to reduce banding in a printed representation of the given image; and
   dispensing ink from the print head based on the filtered profile, wherein dispensing ink comprises dispensing the ink via multiple passes of the print head according to the filtered profile in place of each single print pass according to the command profile;
   wherein the filtered profile defines, for each pass of the multiple passes, different droplet sizes for ink emitted from a plurality of ink jets of the print head during that pass.

7. The method of claim 6, wherein the filter comprises a stochastic filter.

8. The method of claim 6, wherein the filter comprises a blue noise filter.

9. The method of claim 6, wherein the filter randomizes the droplet sizes for the ink emitted from the plurality of ink jets.

10. The method of claim 6, wherein the filter comprises a first filter comprising a first array of numbers and a second filter comprising a second array of numbers, and wherein the dispensing ink via multiple passes of the print head according to the filtered profile includes:
    dispensing ink during a first pass of the multiple passes based on the first filter; and
    dispensing ink during a second pass of the multiple passes based on the second filter.

11. The method of claim 6, wherein the ink emitted from the plurality of ink jets of the ink jet printhead comprises ultra-violet (UV) curable ink.

12. The method of claim 6, wherein an average droplet size for the filtered profile is less than an average droplet size for the command profile.

13. A machine-readable medium including instructions that, when executed by processing circuitry, cause the processing circuitry to perform operations, the operations comprising:
    generating a command profile for printing a given image, the command profile including droplet sizes for a plurality of single print passes of a print head of a printer for producing the given image;
    generating a filter comprising an array of numbers, the numbers being at least one of: random, semi-random, quasi-random, based on an algorithm, or based on a predetermined pattern;
    applying the filter to the command profile to provide a filtered profile of modified droplet sizes configured to reduce banding in a printed representation of the given image; and
    dispensing ink from the print head based on the filtered profile, wherein dispensing ink comprises dispensing the ink via multiple passes of the print head according to the filtered profile in place of each single print pass according to the command profile;
    wherein the filtered profile defines, for each pass of the multiple passes, different droplet sizes for ink emitted from a plurality of ink jets of the print head during that pass.

14. The machine-readable medium of claim 13, wherein the filter comprises a stochastic filter.

15. The machine-readable medium of claim 13, wherein the filter comprises a blue noise filter.

16. The machine-readable medium of claim 13, wherein the filter randomizes the droplet sizes for the ink emitted from the plurality of ink jets.

17. The machine-readable medium of claim 13, wherein the filter comprises a first filter comprising a first array of numbers and a second filter comprising a second array of numbers, and wherein the operation of dispensing ink via multiple passes of the print head according to the filtered profile includes:
    dispensing ink during a first pass of the multiple passes based on the first filter; and
    dispensing ink during a second pass of the multiple passes based on the second filter.

18. The machine-readable medium of claim 13, wherein the operation of dispensing ink includes dispensing ultra-violet (UV) curable ink.

19. The machine-readable medium of claim 13, wherein the multiple passes are configured to increase an opacity of the printed representation of the given image compared to a first pass of the multiple passes.

20. The machine-readable medium of claim 13, wherein an average droplet size for the filtered profile is less than an average droplet size for the command profile.

* * * * *